(12) United States Patent
Yao et al.

(10) Patent No.: US 11,625,076 B2
(45) Date of Patent: Apr. 11, 2023

(54) HINGE ASSEMBLY

(71) Applicant: FOSITEK CORPORATION, New Taipei (TW)

(72) Inventors: Hsu-Hong Yao, New Taipei (TW); Mo-Yu Zhang, New Taipei (TW)

(73) Assignee: FOSITEK CORPORATION, New Taipei (TW)

( * ) Notice: Subject to any disclaimer, the term of this patent is extended or adjusted under 35 U.S.C. 154(b) by 0 days.

(21) Appl. No.: 17/504,924

(22) Filed: Oct. 19, 2021

(65) Prior Publication Data

US 2022/0035421 A1    Feb. 3, 2022

Related U.S. Application Data

(63) Continuation of application No. 16/817,183, filed on Mar. 12, 2020, now Pat. No. 11,287,853.

(30) Foreign Application Priority Data

Dec. 9, 2019 (TW) ................................. 108144858

(51) Int. Cl.
    *G06F 1/16* (2006.01)
(52) U.S. Cl.
    CPC .......... *G06F 1/1681* (2013.01); *G06F 1/1616* (2013.01)
(58) Field of Classification Search
    CPC ............................ G06F 1/1681; G06F 1/1616
    See application file for complete search history.

(56) References Cited

U.S. PATENT DOCUMENTS

| 9,759,242 | B2* | 9/2017 | Hsu ...................... F16M 13/005 |
| 11,016,541 | B2* | 5/2021 | Lin ........................ E05D 3/122 |
| 11,287,853 | B2* | 3/2022 | Yao ....................... G06F 1/1681 |
| 2020/0409427 | A1* | 12/2020 | Hsu .......................... E05D 1/04 |
| 2021/0076511 | A1* | 3/2021 | Yang .................... H05K 5/0226 |
| 2021/0081808 | A1 | 6/2021 | Liao et al. |
| 2021/0165466 | A1* | 6/2021 | Kang .................... H04M 1/022 |
| 2021/0181808 | A1* | 6/2021 | Liao ...................... G06F 1/1681 |
| 2021/0195775 | A1* | 6/2021 | Zhao ...................... E05D 3/122 |
| 2021/0200277 | A1 | 7/2021 | Park et al. |
| 2021/0223827 | A1 | 7/2021 | Moon et al. |

* cited by examiner

*Primary Examiner* — Victor D Batson
*Assistant Examiner* — Matthew J Sullivan
(74) *Attorney, Agent, or Firm* — Birch, Stewart, Kolasch & Birch, LLP

(57) ABSTRACT

A hinge assembly is provided for hingedly connecting a first frame to a second frame, and includes at least one hinge module which includes a first mounting base, a first connection member, a second connection member, and a transmission unit. The first and second connection members are coupled to the first and second frames, respectively, and are turnably mounted to the first mounting base respectively about first and second turning axes which are parallel to and offset from each other. The transmission unit is provided to permit the first and second connection members to turn in opposite rotational directions from each other whilst turning simultaneously.

4 Claims, 17 Drawing Sheets

HINGE ASSEMBLY

CROSS-REFERENCE TO RELATED APPLICATION

This application is a continuation application of U.S. patent application Ser. No. 16/817,183 filed on Mar. 12, 2020, which claims priority from Taiwanese invention patent application no. 108144858, filed on Dec. 9, 2019. The entire content of each of the U.S. and Taiwanese patent applications is incorporated herein by reference.

FIELD

The disclosure relates to a hinge assembly.

BACKGROUND

In recent years, flexible screens are gradually becoming more widely used in daily electronic products (such as mobile phones, tablet computers, etc.). These electronic products are usually equipped with hinges to permit the flexible screens to be folded or unfolded. Based on the design of the hinges, the flexible screens of these electronic products may be folded inside or outside. However, the flexible screen may be damaged if the curvature radius at a folded bent portion of the flexible screen is less than a certain value.

SUMMARY

Therefore, an object of the disclosure is to provide a hinge assembly by which a flexible screen may be prevented from being damaged when the flexible screen is folded.

According to the disclosure, a hinge assembly is provided for hingedly connecting a first frame to a second frame, and includes at least one hinge module which includes a first mounting base, a first connection member, a second connection member, and a transmission unit. The first mounting base has a left margin and a right margin opposite to the left margin in a left-and-right direction, and includes a front end segment, a rear end segment, and a middle segment. The front end segment has a front groove which extends from one of the left and right margins of the first mounting base in the left-and-right direction to terminate at a front groove end. The rear end segment is disposed opposite to the front end segment in a front-and-rear direction, and has a rear groove which extends from the other one of the left and right margins of the first mounting base in the left-and-right direction to terminate at a rear groove end. The middle segment is disposed between the front and rear end segments. The first connection member has a first inner segment and a first outer segment. The first inner segment is coupled inside the front groove to be turnable about a first turning axis in the front-and-rear direction. The first outer segment extends outwardly from the first inner segment, and is configured for being connected to the first frame. The second connection member has a second inner segment and a second outer segment. The second inner segment is coupled inside the rear groove to be turnable about a second turning axis which is parallel to and offset from the first turning axis. The second outer segment extends outwardly from the second inner segment, and is configured for being connected to the second frame. The transmission unit is disposed on the middle segment of the first mounting base, and is configured to couple the first inner segment of the first connection member to the second inner segment of the second connection member such that the first and second connection members are permitted to turn in opposite rotational directions from each other whilst turning simultaneously and respectively about the first and second turning axes relative to the first mounting base, and such that the hinge module is transformable between a first angular position, where the first and second outer segments are distal from each other, and a second angular position, where the first and second outer segments are proximate to and spaced apart from each other by a gap.

With the provision of the hinge assembly for hingedly connecting the first and second frames, a flexible screen retained on the first and second frames may be folded to have a relatively large curvature radius, and is less likely to be damaged. This is because the first and second outer segments of the first and second connection members are spaced apart from each other by a gap when the flexible screen is folded (i.e., the hinge module is in the second angular position).

BRIEF DESCRIPTION OF THE DRAWINGS

Other features and advantages of the disclosure will become apparent in the following detailed description of the embodiment(s) with reference to the accompanying drawings, in which.

DETAILED DESCRIPTION

Figure 1:
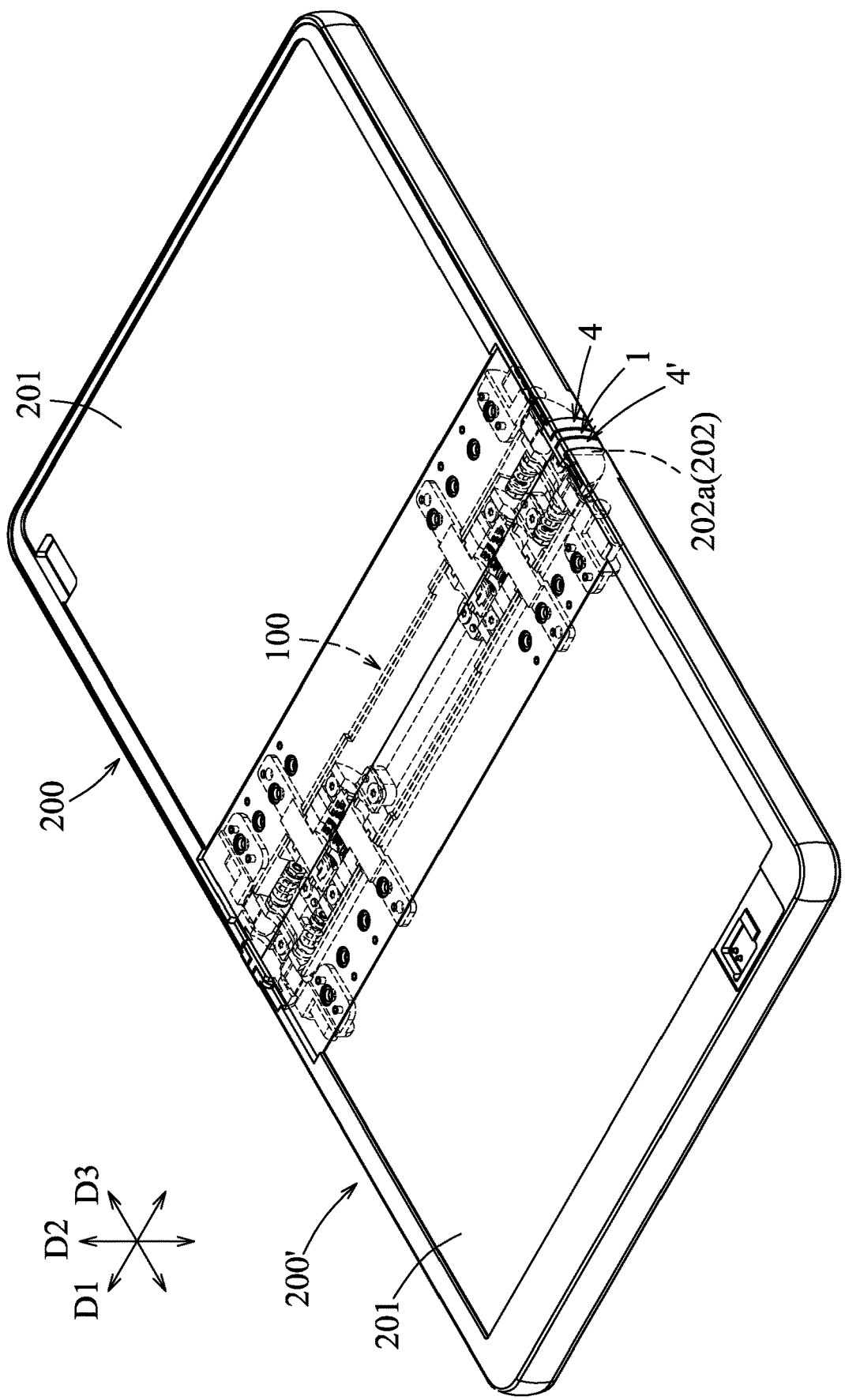
FIG. 1 is a perspective view of a foldable device according to an embodiment the disclosure, illustrating the embodiment in a unfolded position.

Before the disclosure is described in greater detail, it should be noted that where considered appropriate, reference numerals have been repeated among the figures to indicate corresponding or analogous elements, which may optionally have similar characteristics.

Figure 2:
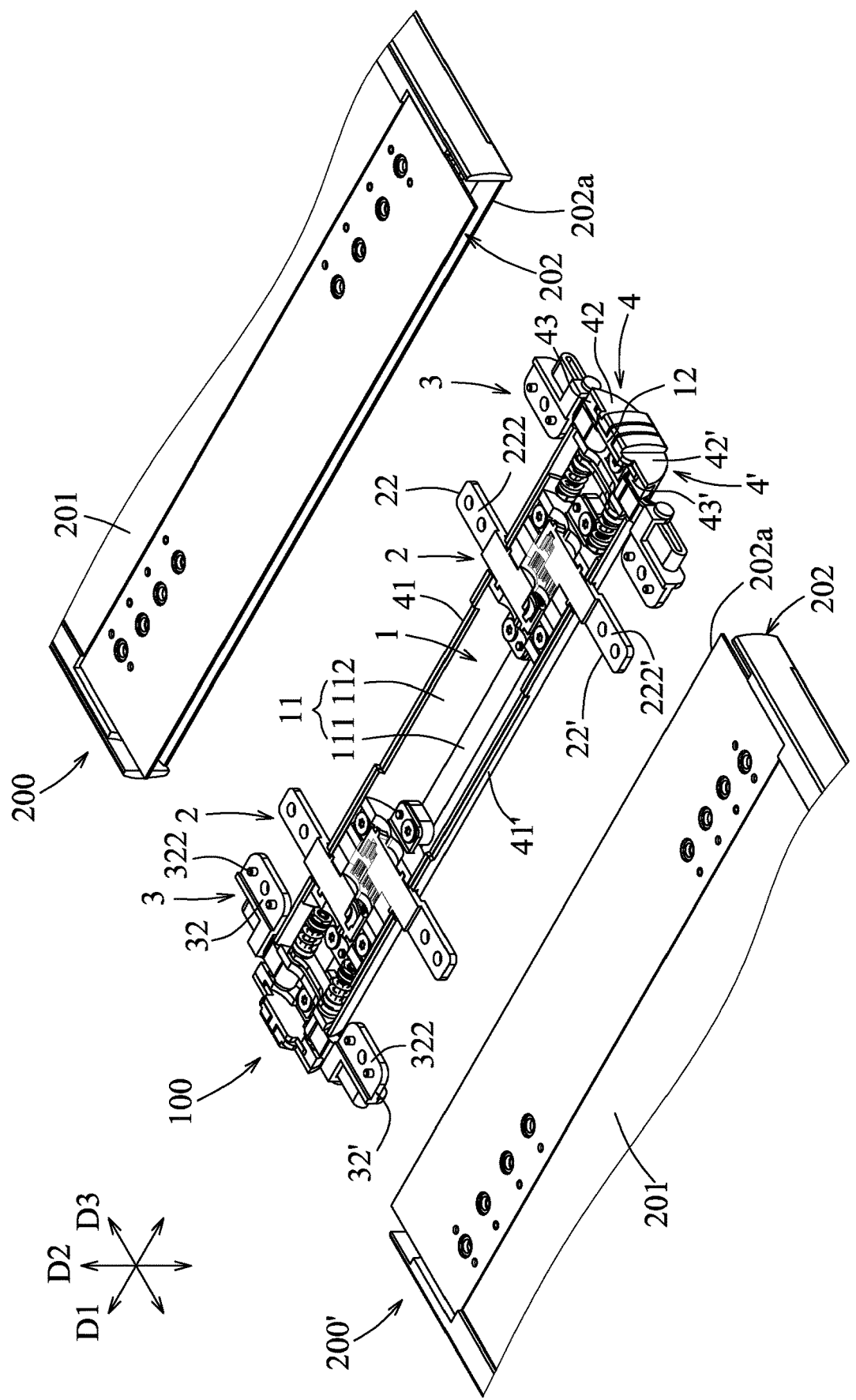
FIG. 2 is a fragmentary, partially exploded perspective view of FIG. 1.

With reference to FIGS. 1 and 2, a foldable device according to an embodiment of the disclosure includes a first frame 200, a second frame 200' and a hinge assembly 100 for hingedly connecting the first frame 200 to the second frame 200'. Each of the first and second frames 200, 200' has a mounting surface 201. A flexible screen (not shown) is mounted and retained on the mounting surfaces 201 of the first and second frames 200, 200' to constitute a foldable/portable electronic device such as a mobile phone, a tablet computer, a notebook computer, etc.

As shown in FIGS. 3 to 6, the hinge assembly 100 includes at least one hinge module 2 which includes a first mounting base 21, a first connection member 22, a second connection member 22', and a transmission unit 23.

Figure 5:
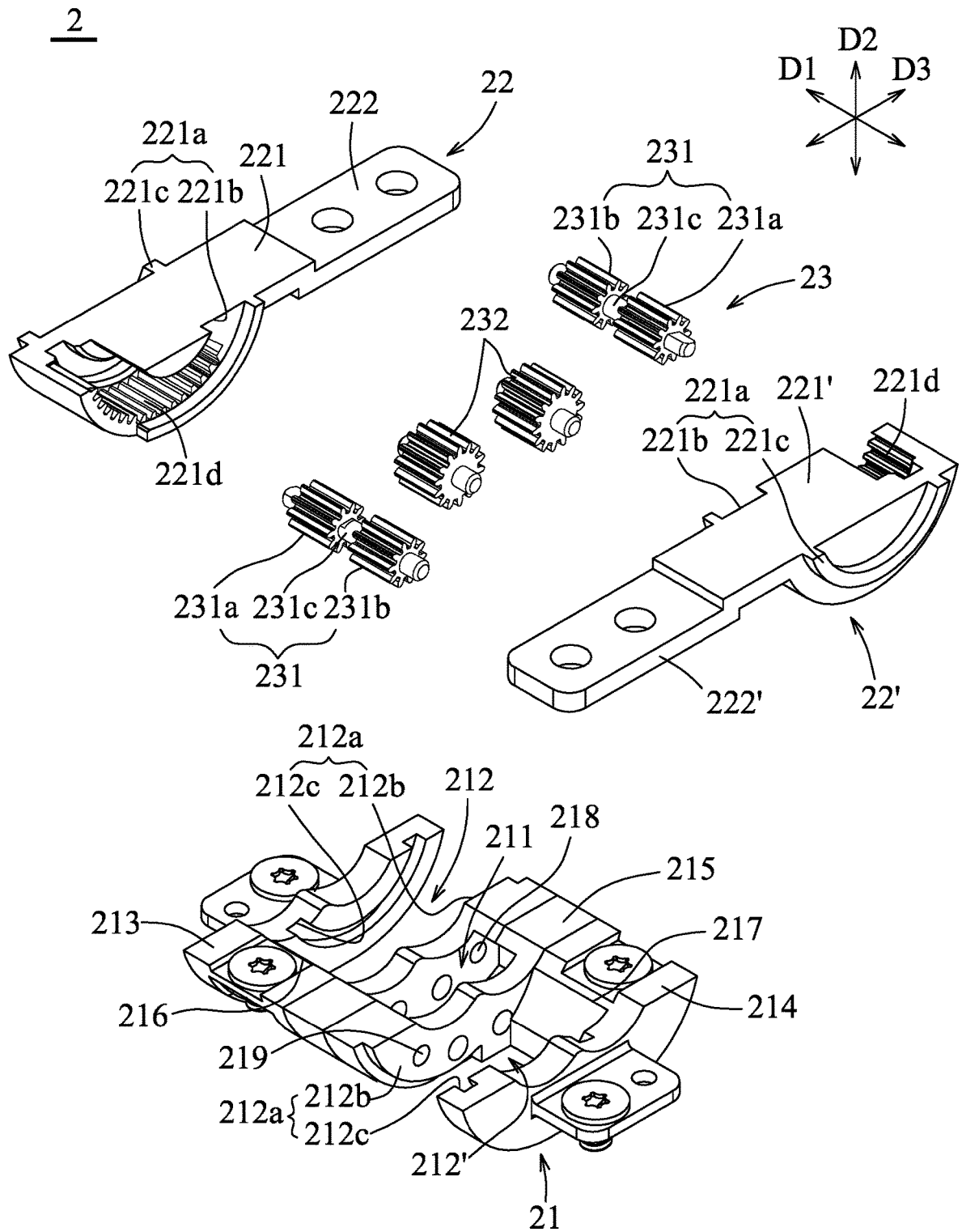
FIG. 5 is an exploded perspective view of FIG. 4.

As shown in FIG. 5, the first mounting base 21 has a left margin and a right margin opposite to the left margin in a left-and-right direction (D3), and includes a front end segment 213, a rear end segment 214, and a middle segment 215. The front end segment 213 has a front groove 212 which extends from one of the left and right margins of the first mounting base 21 in the left-and-right direction (D3) to terminate at a front groove end 216. The rear end segment 214 is disposed opposite to the front end segment 213 in a front-and-rear direction (D1), and has a rear groove 212' which extends from the other one of the left and right margins of the first mounting base 21 in the left-and-right direction (D3) to terminate at a rear groove end 217. The middle segment 215 is disposed between the front and rear end segments 213, 214.

In an embodiment shown in FIG. 5, the middle segment 215 of the first mounting base 21 may have a middle cavity 211, a front bore 218, and a rear bore 219. The front bore 218 extends along a first bore axis in the front-and-rear direction (D1) to communicate the middle cavity 211 to the front groove 212. The rear bore 219 extends along a second bore axis in the front-and-rear direction (D1) to communicate the middle cavity 211 to the rear groove 212'. The second bore axis is parallel to and offset from the first bore axis.

The first connection member 22 has a first inner segment 221 and a first outer segment 222. The first inner segment 221 is coupled inside the front groove 212 to be turnable about a first turning axis (A) in the front-and-rear direction (D1). The first outer segment 222 extends outwardly from the first inner segment 221, and is configured for being connected to the first frame 200.

The second connection member 22' has a second inner segment 221' and a second outer segment 222'. The second inner segment 221' is coupled inside the rear groove 212' to be turnable about a second turning axis (A') which is parallel to and offset from the first turning axis (A). The second outer segment 222' extends outwardly from the second inner segment 221', and is configured for being connected to the second frame 200'.

In an embodiment shown in FIGS. 6 to 13, the first and second turning axes (A, A') are located above the first mounting base 21 and are spaced apart from each other in the left-and-right direction (D3).

Figure 4:
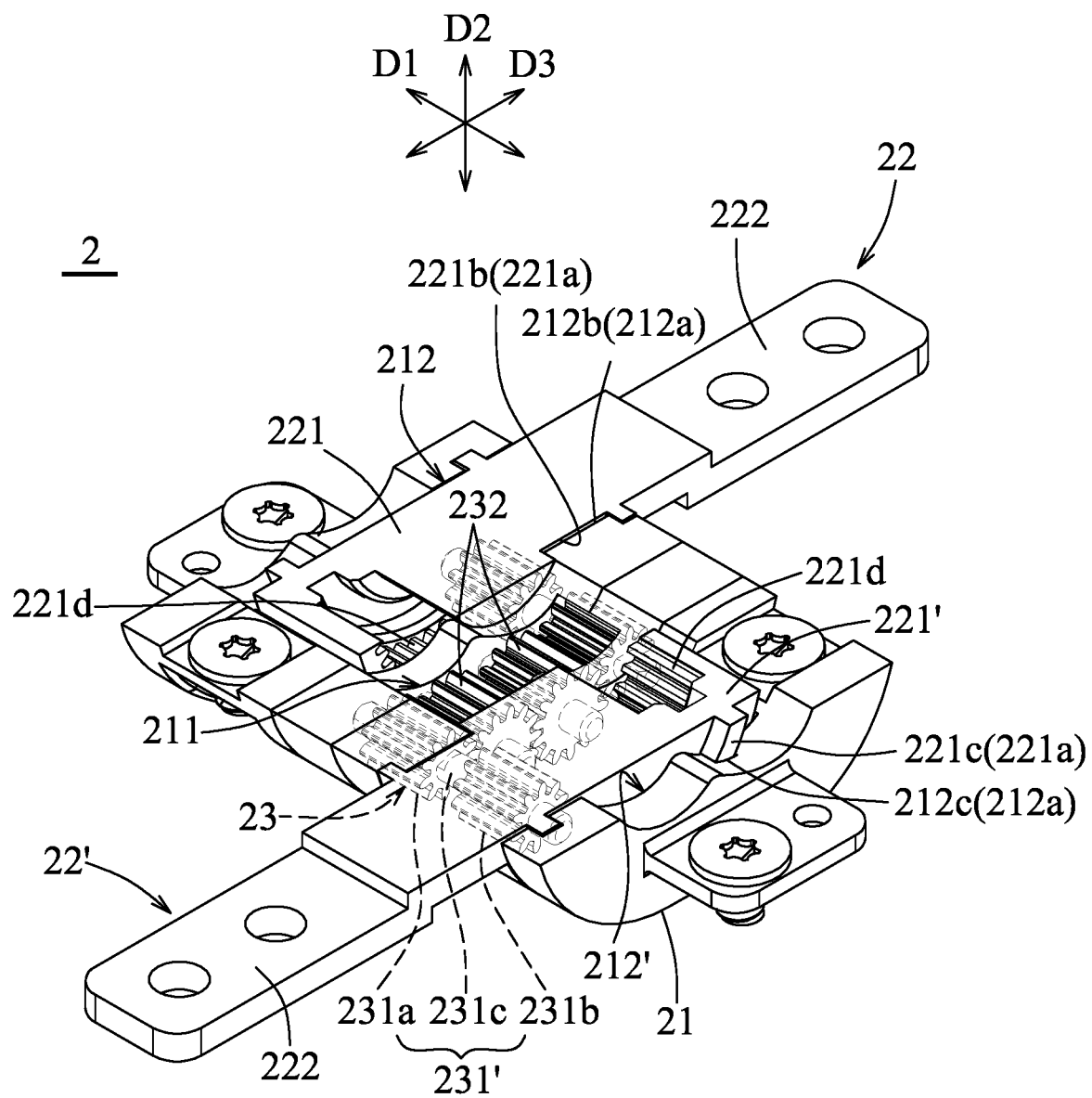
FIG. 4 is a perspective view of a hinge module of the hinge assembly.
Figure 9:
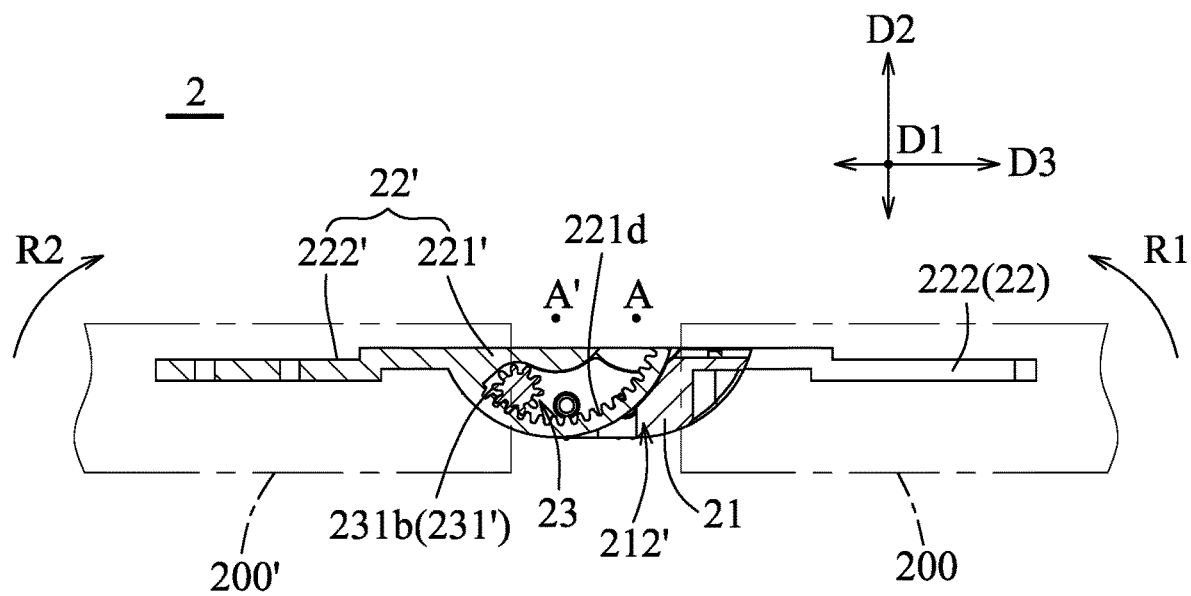
FIG. 9 is a cross-sectional view taken along line 9-9 of FIG. 6.
Figure 13:
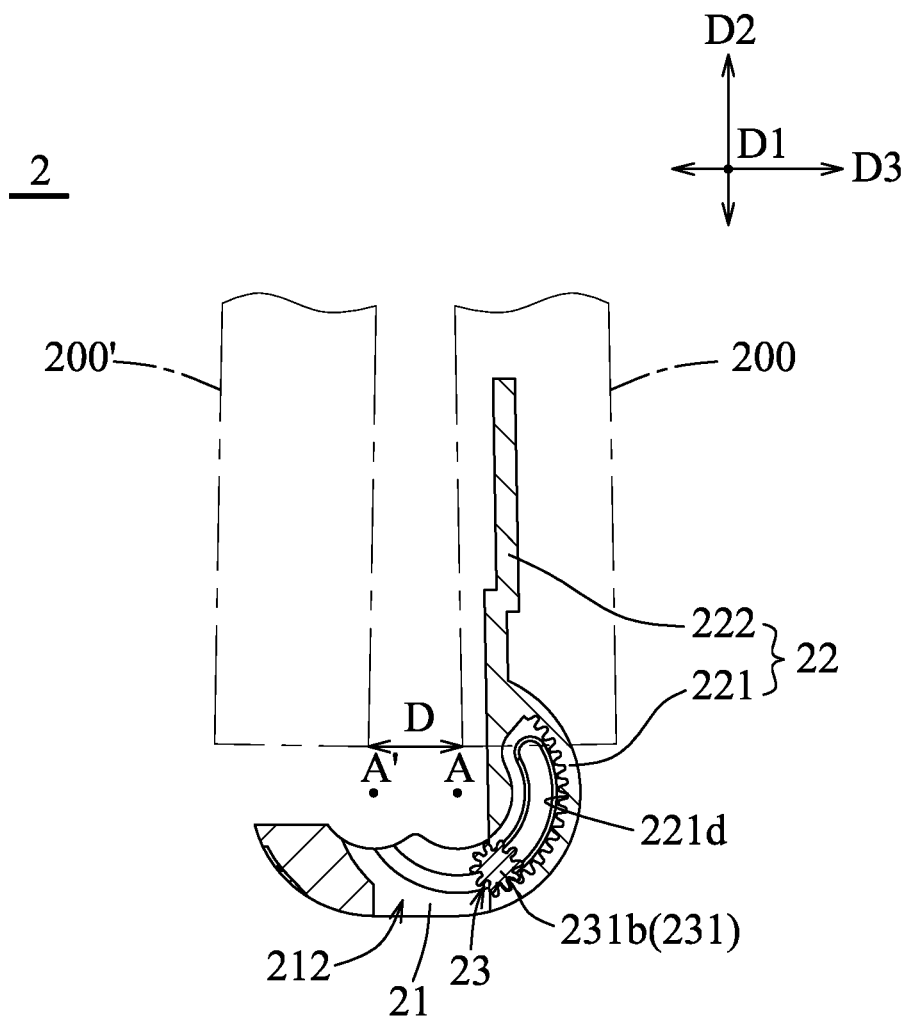
FIG. 13 is another cross-sectional view illustrating the hinge module in the second angular position.

In an embodiment shown in FIGS. 5, 9, and 13, each of the first and the second inner segments 221, 221' may have a curved toothed surface 221d which extends about a respective one of the first and second pivot axes (A, A'). To wit, as shown in FIGS. 4 and 5, the first and the second inner segments 221, 221' of the first and second connection members 22, 22' are always not in alignment with each other in the front-and-rear direction (D1).

Figure 6:
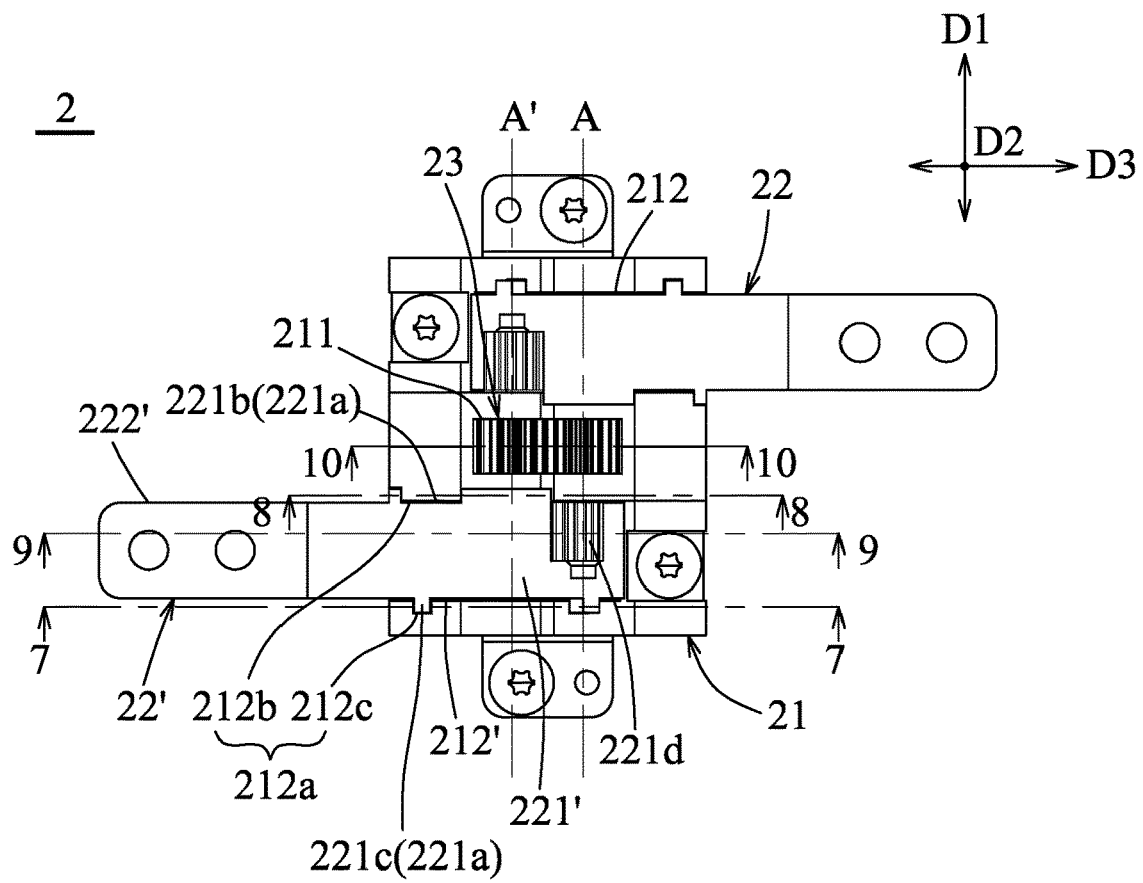
FIG. 6 is a top view of the hinge module, illustrating the hinge module in a first angular position.
Figure 11:
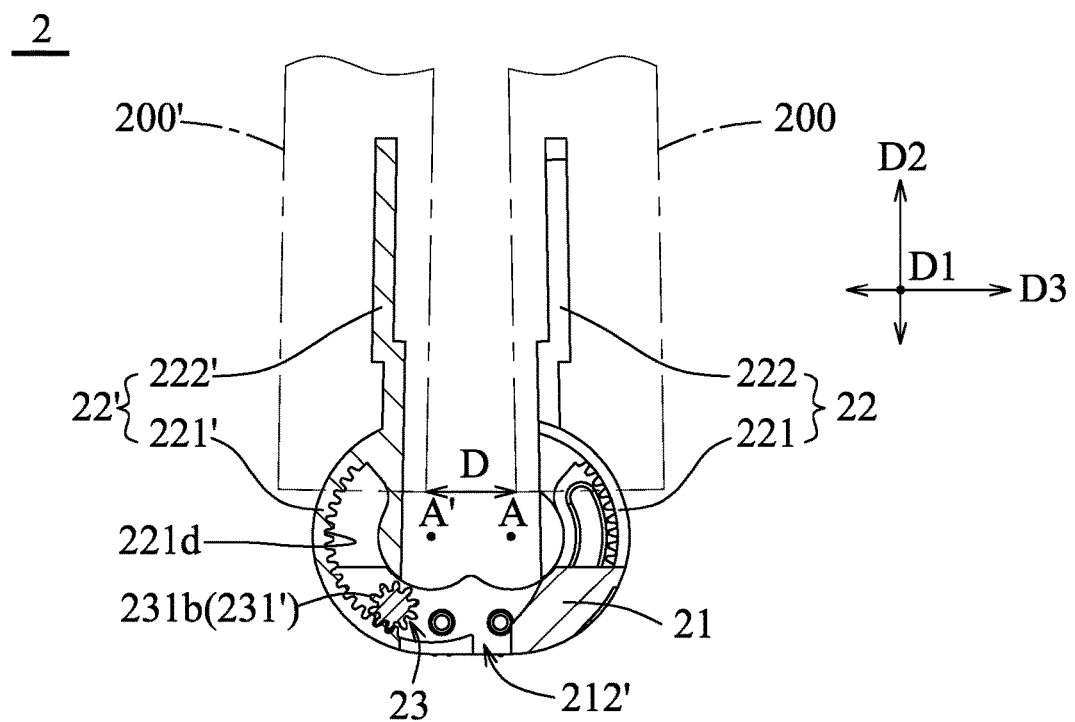
FIG. 11 is similar to FIG. 9 but illustrating the hinge module in a second angular position.
Figure 12:
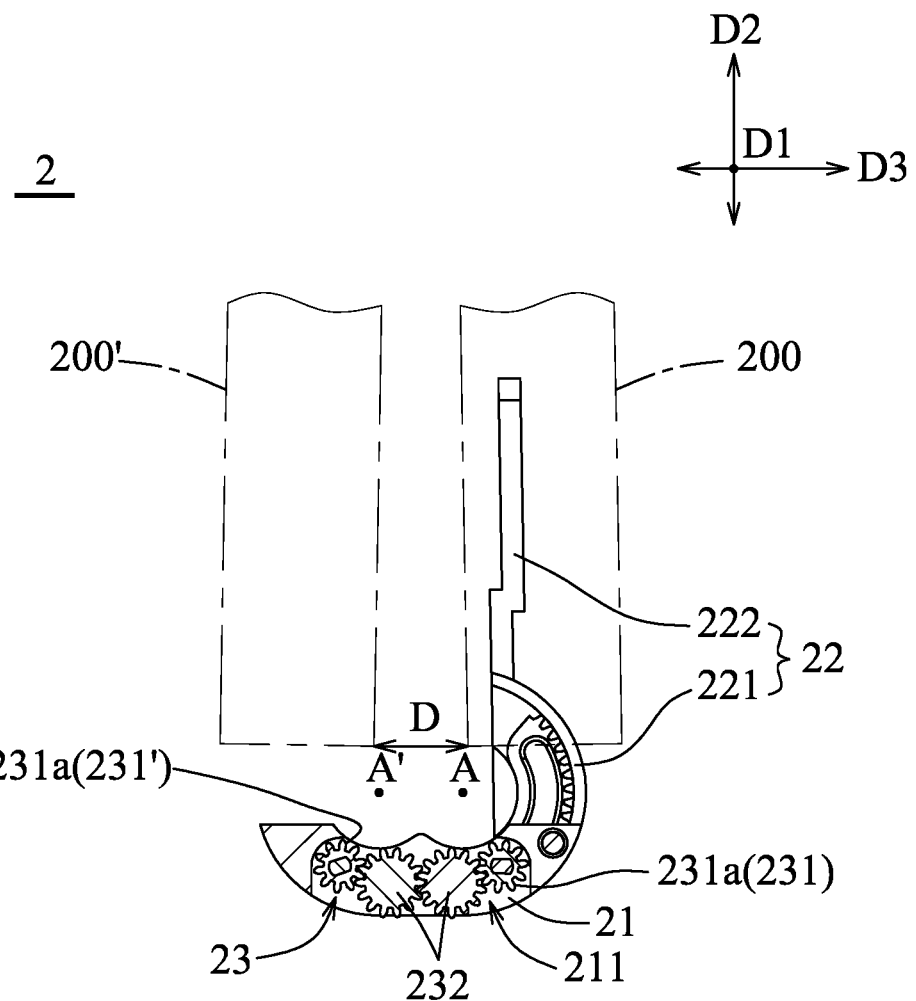
FIG. 12 is similar to FIG. 10 but illustrating the hinge module in the second angular position.
Figure 20:
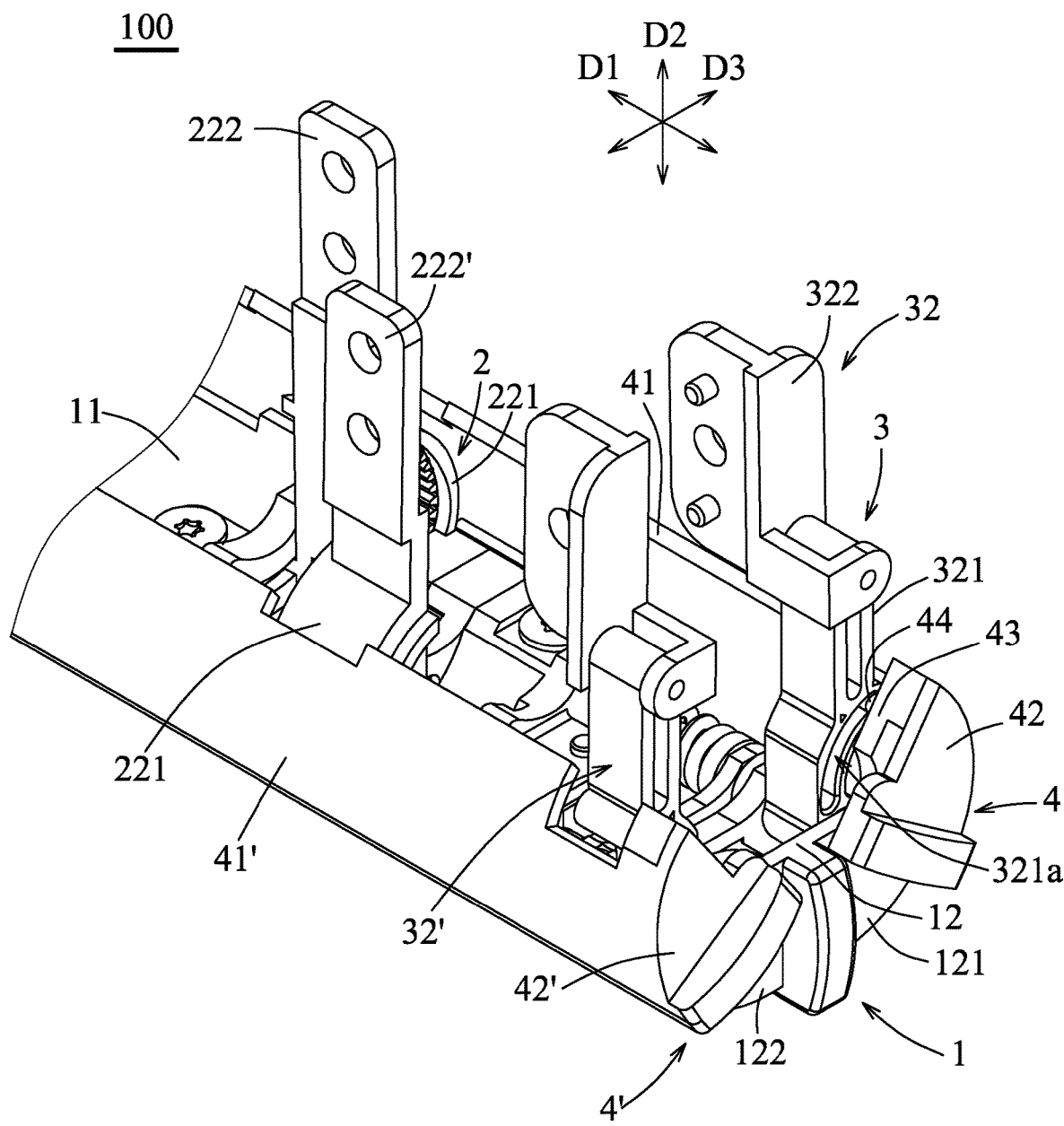
FIG. 20 is a fragmentary perspective view of the hinge assembly illustrating the frictional positioning module and the hinge module in the second angular position.
Figure 21:
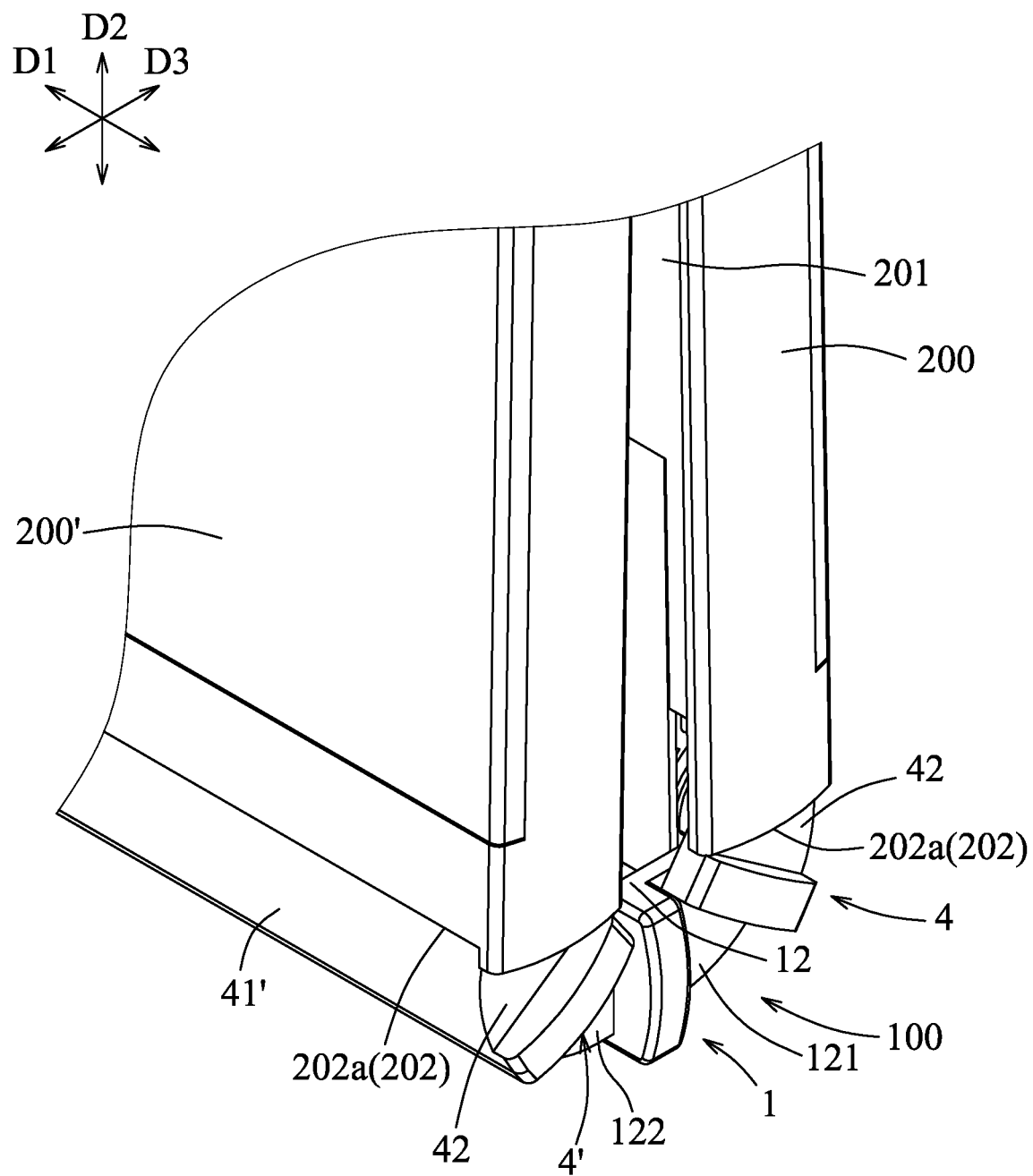
FIG. 21 is a fragmentary perspective view of the foldable device in a folded position.

The transmission unit 23 is disposed on the middle segment 215 of the first mounting base 21, and is configured to couple the first inner segment 221 of the first connection member 22 to the second inner segment 221' of the second connection member 22' such that the first and second connection members 22, 22' are permitted to turn in opposite rotational directions from each other whilst turning simultaneously and respectively about the first and second turning axes (A, A') relative to the first mounting base 21, and such that the hinge module 2 is transformable between a first angular position and a second angular position. In the first angular position, as shown in FIGS. 4 and 6, the first and second outer segments 222, 222' are distal from each other, while the first and second frames 200, 200' of the foldable device are in an unfolded position (FIG. 1). In the second angular position, as shown in FIGS. 11 and 20, the first and second outer segments 222, 222' are proximate to and spaced apart from each other by a gap (D), while the first and second frames 200, 200' of the foldable device are in a folded position (FIG. 21). Because the first and second outer segments 222, 222' are proximate to and spaced apart from each other by the gap (D) when the folded device in the folded position, the non-shown flexible screen may be prevented from being damaged due to a curvature radius being too small at a folded bent portion of the flexible screen.

In an embodiment, each of the front and rear grooves 212, 212' is configured such that when the hinge module 2 is in the first angular position (FIG. 4), the first and second inner segments 221, 221' are respectively received in the front and rear grooves 212, 212', and such that when the hinge module 2 is in the second angular position (FIGS. 11 and 20), the first and second inner segments 221, 221' are disposed to partially extend out from the front and rear grooves 212, 212', respectively.

In an embodiment shown in FIGS. 5 and 9 to 13, the transmission unit 23 may include a first gear unit 231, a second gear unit 231', and two intermediate gears 232 which are rotatably mounted inside the middle cavity 211, and which are in mesh with each other. Each of the first and second gear units 231, 231' is configured to couple a respective one of the intermediate gears 232 to a respective one of the first and second connection members 22, 22', and may include a first couple gear 231a, a second couple gear 231b, and a middle stem 231c. The first couple gear 231a is disposed in the middle cavity 211 to be in mesh with the respective intermediate gear 232. The second couple gear 231b is disposed in a respective one of the front and rear grooves 212, 212' to be in mesh with the curved toothed surface 221d of the respective one of the first and second connection members 22, 22'. The middle stem 231c extends through a respective one of the front and rear bores 218, 219, and interconnects the first and second couple gears 231a, 231b to cause co-rotation of the first and second couple gears 231a, 231b about a respective one of the first and second bore axes, so as to permit the first and second connection members 22, 22' to turn in the opposite rotational directions whilst turning simultaneously and respectively about the first and second turning axes (A, A') relative to the first mounting base 21. In each of the first and second gear units 231, 231', for example, the first and second couple gears 231*a*, 231*b* may be separately formed and assembled together through the middle stem 231*c*.

Figure 10:
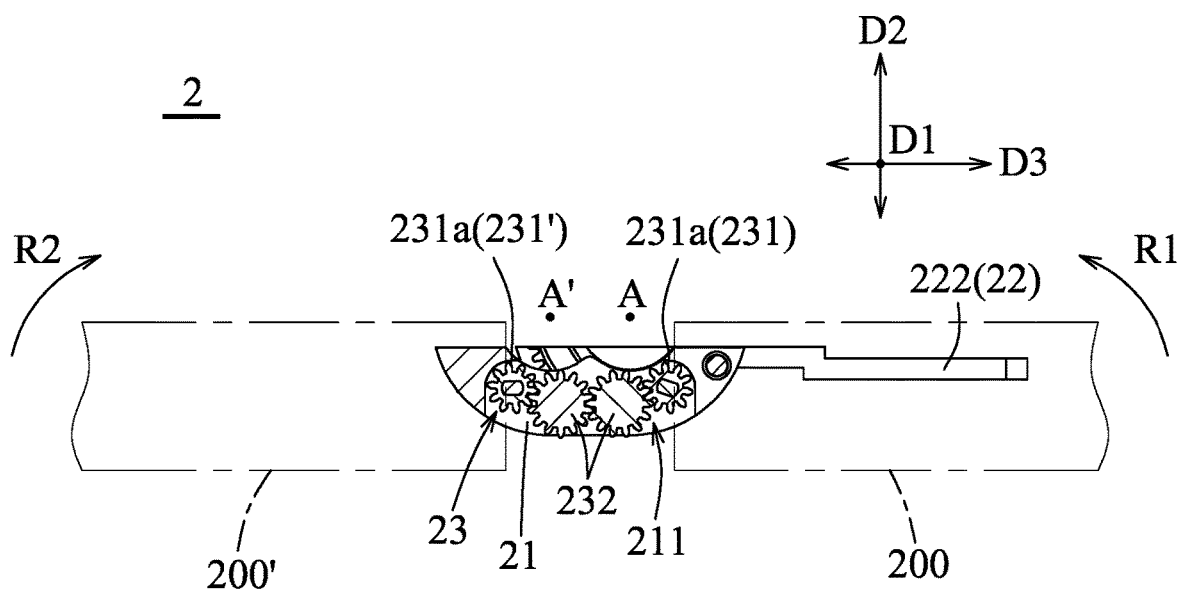
FIG. 10 is a cross-sectional view taken along line 10-10 of FIG. 6.

To convert the foldable device from the unfolded position to the folded position, a user may turn the first and second frames 200, 200' respectively in counterclockwise and clockwise directions (R1, R2) as shown in FIGS. 9 and 10. Meanwhile, the first connection member 22, together with the first couple gear 231*a* of the first gear unit 231, is brought by the first frame 200 to turn about the first turning axis (A) in the counterclockwise direction (R1), and the second connection member 22', together with the first couple gear 231*a* of the second gear unit 231', is brought by the second frame 200' to turn about the second turning axis (A') in the clockwise direction (R2). One of the two intermediate gears 232, which is in mesh with the first couple gear 231*a* of the first gear unit 231, is driven to turn in the clockwise direction (R2), and the other one of the intermediate gears 232, which is in mesh with the first couple gear 231*a* of the second gear unit 231', is driven to turn in the counterclockwise direction (R1). In addition to the above, the two intermediate gears 232 are in mesh with each other, and thus the first and second frames 200, 200' are turned in two opposite rotational directions by the same degree of angle. Furthermore, with the provision of the two intermediate gears 232, the first couple gears 231*a* of the first and second gear units 231, 231' are spaced apart from each other by a relatively large distance in the left-and-right direction (D3), which facilitates respective meshing of the second couple gears 231*b* of the first and second gear units 231, 231' with the curved toothed surfaces 221*d* of the first and second connection members 22, 22' in a smooth manner.

Figure 7:
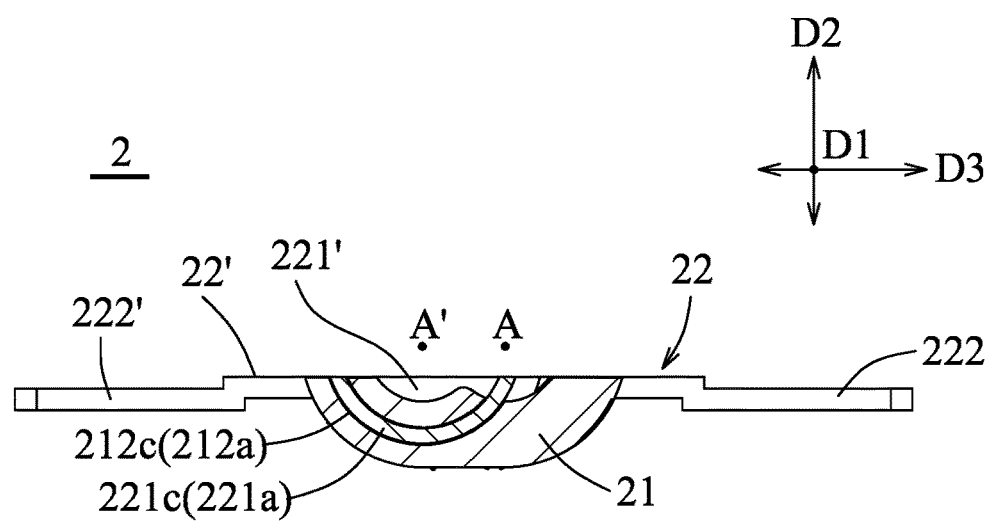
FIG. 7 is a cross-sectional view taken along line 7-7 of FIG. 6.
Figure 8:
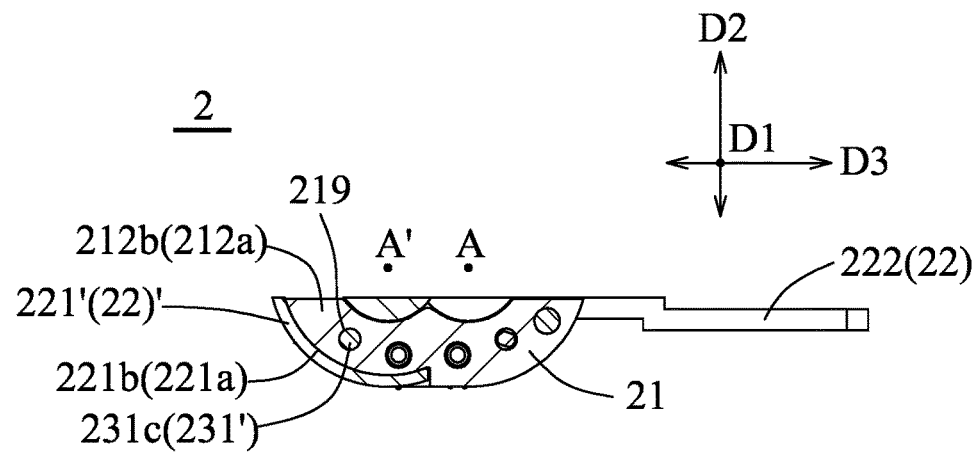
FIG. 8 is a cross-sectional view taken along line 8-8 of FIG. 6.

In an embodiment shown in FIGS. 4, 5, and 7, the hinge module 2 may further include two guiding units 212*a* and two guided units 221*a*. The two guiding units 212*a* are provided respectively in the front and rear grooves 212, 212'. The two guided units 221*a* are provided respectively on the first and second inner segments 221, 221', and are respectively guided by the two guiding units 212*a* so as to permit the first and second inner segments 221, 221' to respectively turn about the first and second turning axes (A, A').

In an embodiment shown in FIGS. 4, 5, and 7, each of the guiding units 212*a* may include a first protrusion 212*b* and a first indentation 212*c* which are disposed in the respective one of the front and rear grooves 212, 212', and which are opposite to each other in the front-and-rear direction (D1). The first protrusion 212*b* and the first indentation 212*c*, provided in the front groove 212, extend about the first pivot axis (A), while the first protrusion 212*b* and the first indentation 212*c*, provided in the rear groove 212', extend about the second pivot axis (A'). Each of the guided units 221*a* may include a second indentation 221*b* and a second protrusion 221*c* which are provided on the respective one of the first and second inner segments 221, 221', and which slidably mate with the first protrusion 212*b* and the first indentation 212*c* of the respective guiding unit 212*a*, respectively. The structure of the guiding units 212*a* and the guided units 221*a* may be modified based on requirement, and should not be limited to the embodiment.

In an embodiment shown in FIGS. 2, 3, 14, and 15, the hinge assembly 100 may further include a retaining mount 1 and at least one frictional positioning module 3.

Figure 3:
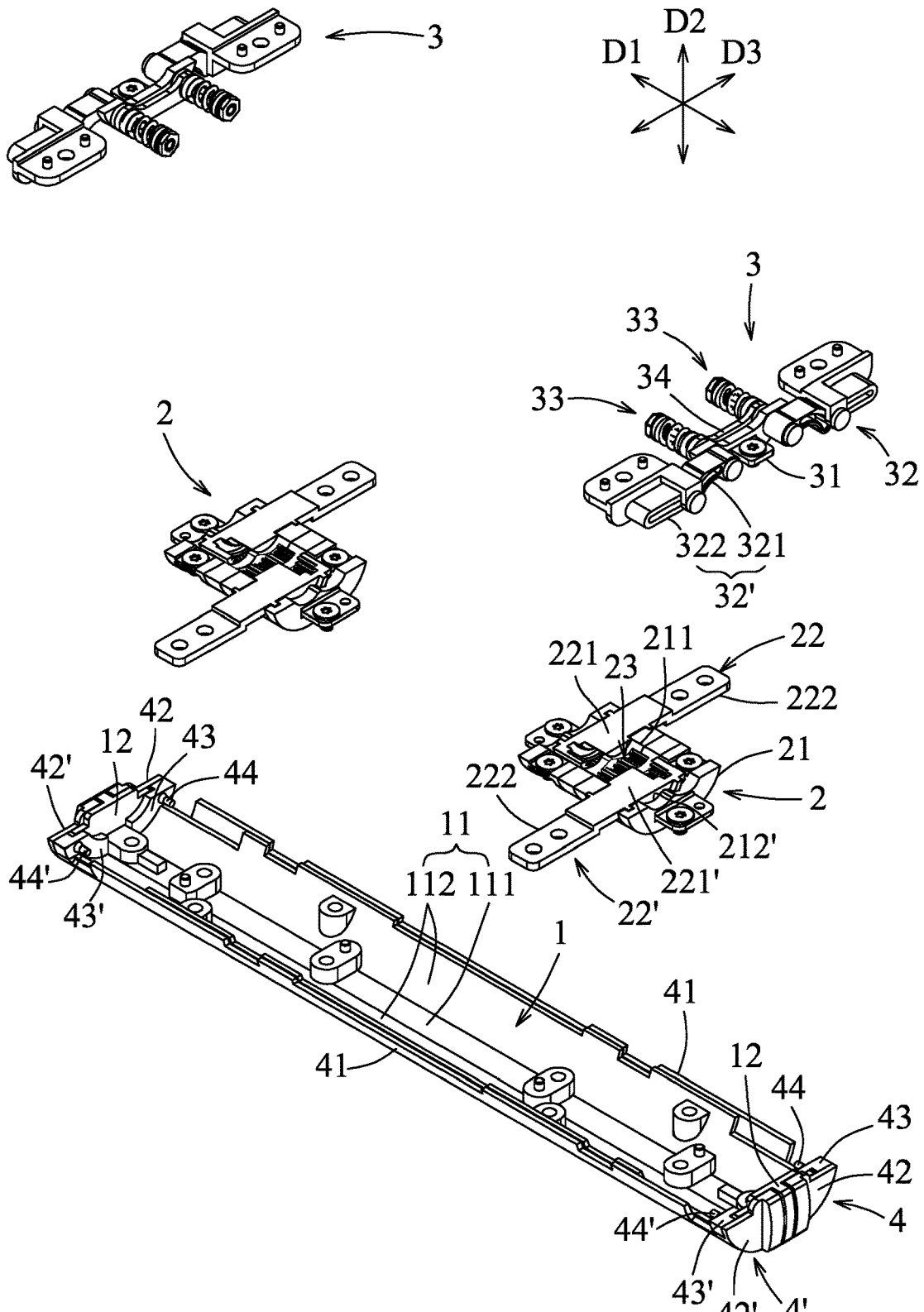
FIG. 3 is a further exploded perspective view of a hinge assembly of the foldable device in FIG. 2.

The retaining mount 1 may extend in the front-and-rear direction (D1) to retain the first mounting base 21 thereon. In an embodiment shown in FIG. 3, the retaining mount 1 may include a bottom retaining wall 11 and two retaining end walls 12. The bottom retaining wall 11 is configured to retain the first mounting base 21 and a second mounting base 31 (described below) thereon, and may have an elongated flat portion 111 which is elongated in the front-and-rear direction (D1), and two curved portions 112 which are respectively bent upward from left and right edges of the elongated flat portion 111. The two retaining end walls 12 are respectively mounted to front and rear edges of the bottom retaining wall 11 to extend upwardly in an upright direction (D2), and are opposite to each other in the front-and-rear direction (D1). As shown in FIGS. 3, 20, and 21, each of the retaining end walls 12 may be in a substantially semicircular form, and has a first wall half 121 and a second wall half 122 opposite to the first wall half 121 in the left-and-right direction (D3).

The frictional positioning module 3 may include the second mounting base 31 (mentioned above), a third connection member 32, a fourth connection member 32', two pivot shafts 33, and two coil springs 335.

The second mounting base 31 is retained on the retaining mount 1 to be spaced apart from the first mounting base 21 in the front-and-rear direction (D1), and has two end segments 311 opposite to each other in the left-and-right direction (D3).

Figure 15:
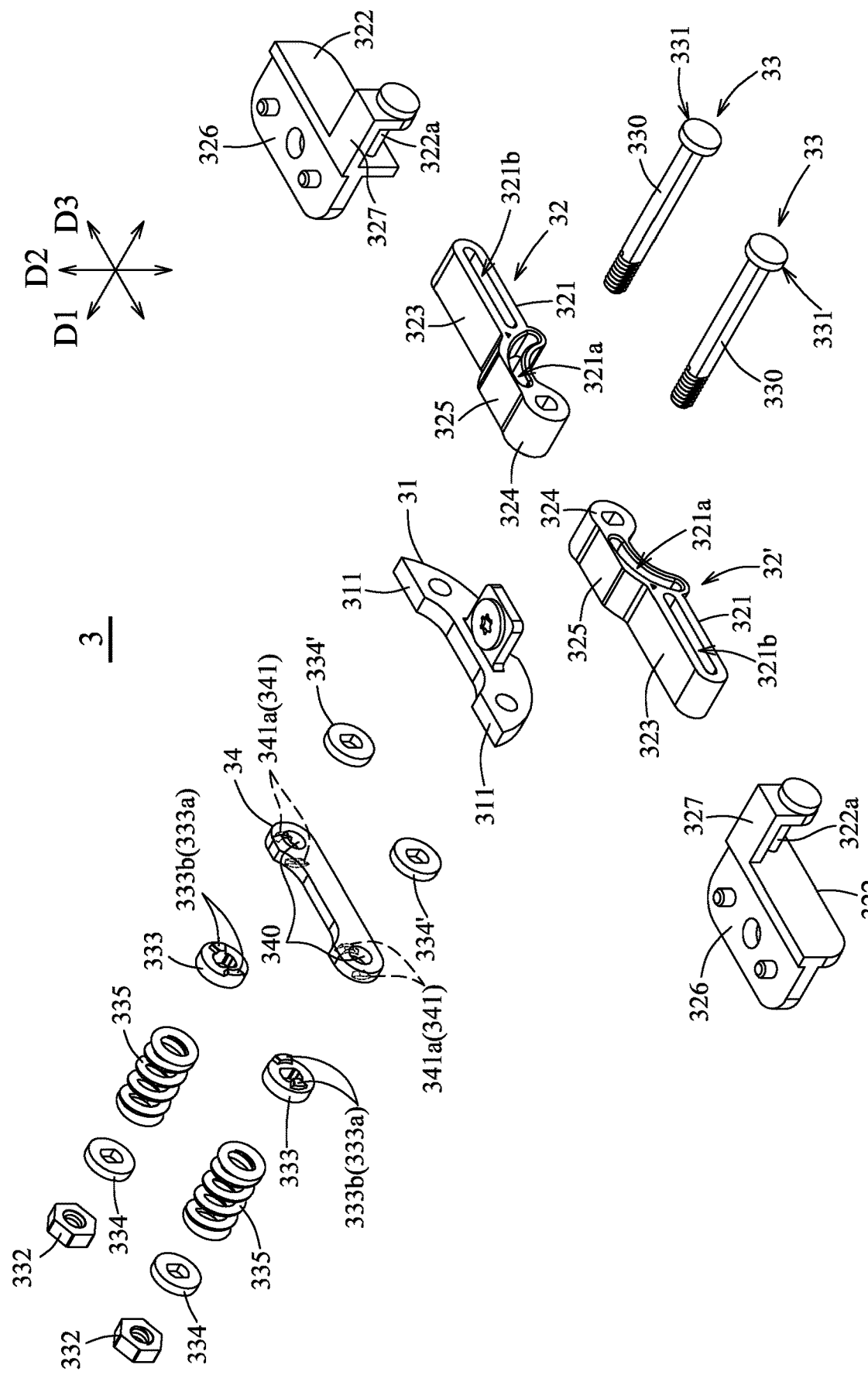
FIG. 15 is an exploded perspective view of FIG. 14.

Each of the pivot shafts 33 extends in the front-and-rear direction (D1) through a respective one of the two end segments 331 of the second mounting base 31 to be turnable relative to the second mounting base 31. Each of the pivot shafts 33 has a coupling end 331, an enlarged head end 332, and a shaft body 330 disposed between the enlarged head end 332 and the second mounting base 31. For example, as shown in FIG. 15, the coupling end 331 and a shaft body 330 may constitute a screw bolt, and the enlarged head end 332 may be formed on the screw bolt by threadedly engaging a nut on the screw bolt. In this embodiment, the cross-section of the shaft body 330 is not circular.

Each of the third and fourth connection members 32, 32' is coupled to be turnable relative to the second mounting base 31, and includes an inner connecting segment 321 and an outer connecting segment 322. The inner connecting segment 321 is coupled to the coupling end 331 of a respective one of the pivot shafts 33 so as to permit the respective pivot shaft 33 to turn with the inner connecting segment 321 relative to the second mounting base 31. The outer connecting segment 322 is coupled to permit the inner connecting segment 321 to move therewith, and is configured for being mounted to a respective one of the first and second frames 200, 200'. Therefore, when the foldable device is transformed by turning the first and second frames 200, 200' relative to each other, the third and fourth connection members 32, 32' are allowed to turn respectively with the first and second connection members 22, 22' relative to the second mounting base 31.

Figure 14:
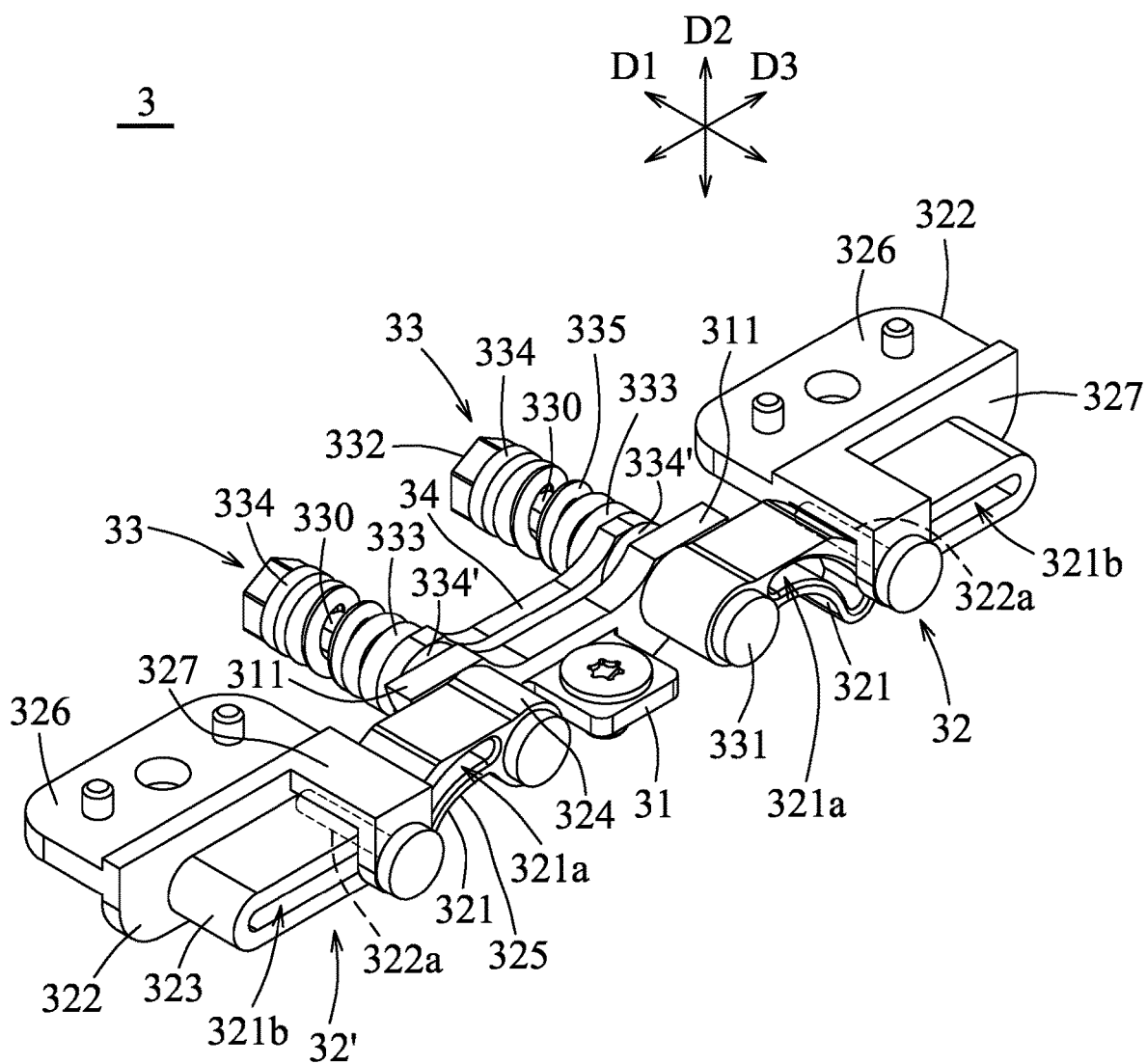
FIG. 14 is a perspective view illustrating a state of a frictional positioning module of the hinge assembly when the hinge module in the first angular position.

In an embodiment shown in FIGS. 14 and 15, the inner connecting segment 321 may have a distal region 323 and a proximate region 324 which is coupled to the coupling end 331 of the respective pivot shaft 33, so as to permit the respective pivot shaft 33 to turn with the inner connecting segment 321 relative to the second mounting base 31.

Figure 16:
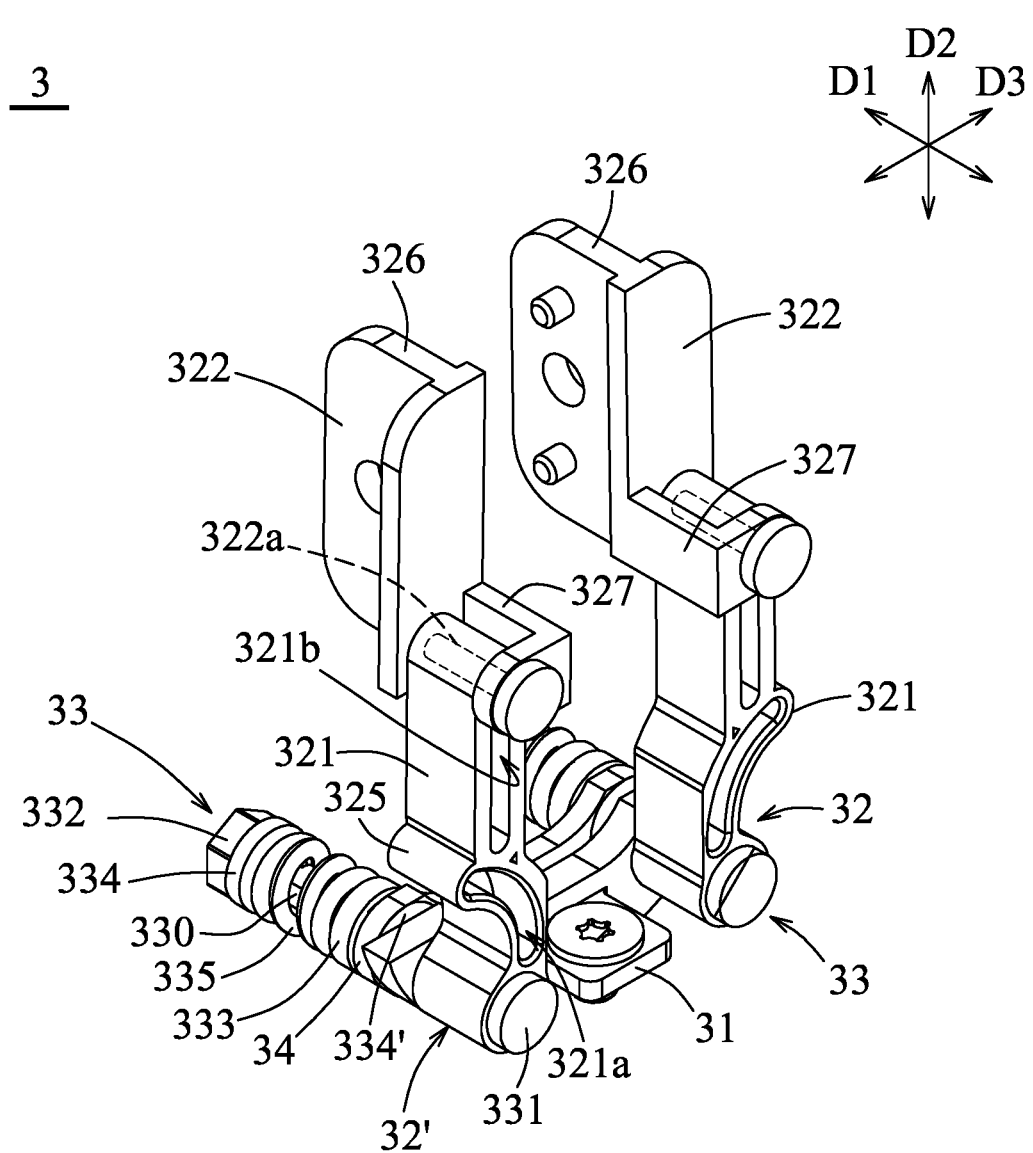
FIG. 16 is a perspective view illustrating a state of the frictional positioning module when the hinge module in the second angular position.

In an embodiment shown in FIGS. 14 to 16, the inner connecting segment 321 may further have an intermediate region 325 which is disposed between the distal and proximate regions 323, 324, and which may be formed with an inner guiding groove 321*a*.

Figure 17:
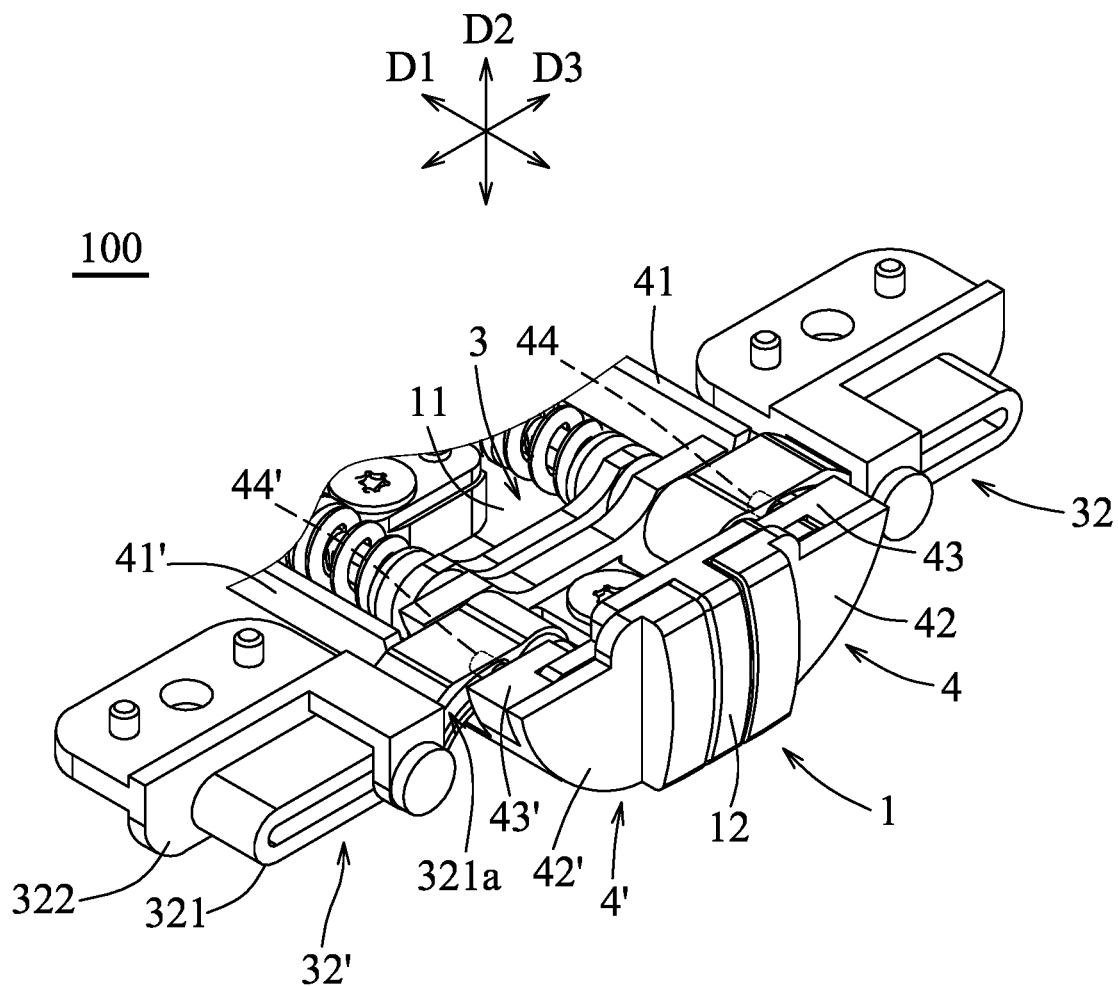
FIG. 17 is a fragmentary perspective view of the hinge assembly illustrating the frictional positioning module.

In an embodiment shown in FIGS. 2, 14, and 15, the outer connecting segment 322 may have a mounted region 326 and a connecting region 327. The mounted region 326 is provided for being mounted to the respective one of the first and second frames 200, 200'. The connecting region 327 is opposite to the mounted region 326 in the front-and-rear direction (D1), and is slidably connected to the distal region 323 to permit the inner connecting segment 321 to move with the outer connecting segment 322 such that when the hinge module 2 is in the first angular position (FIGS. 2 and 4), the outer connecting segment 322 is proximate to the respective pivot shaft 33 (FIGS. 14 and 17), and such that when the hinge module 2 is in the second angular position (FIGS. 11 and 20), the outer connecting segment 322 is distal from the respective pivot shaft (FIGS. 16 and 20).

In an embodiment shown in FIGS. 14 to 16, each of the third and fourth connection members 32, 32' may have an outer guiding groove 321b and a guided pin 322a. The outer guiding groove 321b is formed in the distal region 323 of the inner connecting segment 321. The guided pin 322a is formed on the connecting region 327 of the outer connecting segment 322, and is slidably guided by the outer guiding groove 321b so as to permit the connecting region 327 of the outer connecting segment 322 to be slidably connected to the distal region 323 of the inner connecting segment 321. The outer guiding groove 321b and the guided pin 322a are provided to compensate for the different moving tracks of the inner connecting segment 321 and a respective one of the first and second frames 200, 200' so as to permit smooth movement of the first and second frames 200, 200' relative to the third and fourth connection members 32, 32'.

Each of the coil springs 335 is sleeved on the shaft body 330 of a respective one of the pivot shafts 33 to be compressed between the enlarged head end 332 and the second mounting base 31 so as to permit the third and fourth connection members 32, 32' to be frictionally positioned relative to the second mounting base 31, thereby positioning the first and second connection members 22, 22' relative to the first mounting base 21. Therefore, the first and second frames 200, 200', to which the first, second, third, and fourth connection members 22, 22', 32, 32' are mounted, may be positioned at any desired positions between the folded and unfolded positions.

In an embodiment shown in FIGS. 14 and 15, the frictional positioning module 3 may further include an elongated piece 34 and two positioning washers 333.

The elongated piece 34 is elongated in the left-and-right direction (D3), and two through holes 340 which are configured to permit the shaft bodies 330 of the pivot shafts 33 to respectively extend therethrough, so as to prevent the elongated piece 34 from rotating relative to the second mounting base 31. The elongated piece 34 has a pair of first engaging structures 341 which confront the coil springs 335, respectively. Each of the first engaging structures 341 may be in the form of a recess 341a.

Each of the positioning washers 333 is sleeved on the shaft body 330 of the respective pivot shaft 33 to turn with the respective pivot shaft 33, and is disposed between the elongated piece 34 and the respective coil spring 335. Each of the positioning washers 333 has a second engaging structure 333a which confronts the elongated piece 34 such that when the hinge module 2 is in at least one of the first and second angular positions, the second engaging structures 333a are respectively brought into blocking engagement with the first engaging structures 341 to prevent the third and forth connection members 32, 32', from moving further away from or toward each other, thereby preventing the first and second connection members 22, 22' from moving further away from or toward each other. A center hole of each of the positioning washers 333 may have a shape corresponding to the cross-section of the respective shaft body 330, so as to permit each of the positioning washers 333 to turn with the respective pivot shaft 33. The second engaging structure 333a may be in the form of a protrusion 333b. In an alternate embodiment, each of the second engaging structures 333a is brought into blocking engagement with one of the first engaging structures 341 when in the first angular position, and into blocking engagement with the other one of the first engaging structures 341 when in the second angular position. When each of the second engaging structures 333a is brought into blocking engagement with the corresponding first engaging structure 341, the contact surfaces thereof may mate with each other.

In an embodiment shown in FIGS. 14 and 15, the frictional positioning module 3 may further include a pair of first friction washers 334 and a pair of second friction washers 334'.

Each of the first friction washers 334 is sleeved on the shaft body 330 of the respective pivot shaft 33 to turn with the respective pivot shaft 33, and is disposed between the enlarged head end 332 of the respective pivot shaft 33 and the respective coil spring 335.

Each of the second friction washers 334' is sleeved on the shaft body 330 of the respective pivot shaft 33 to turn with the respective pivot shaft 33, and is disposed between the second mounting base 31 and the elongated piece 34 so as to generate a force, together with the respective coil spring 335 and the respective first friction washer 334, to counteract turning of the respective pivot shaft 33 and a respective one of the third and fourth connection members 32, 32', thereby frictionally positioning a respective one of the first and second connection members 22, 22'. With the provision of the first and second friction washers 334, 334', the first and second frames 200, 200' may be more firmly positioned at any desired positions. A center hole of each of the first and second friction washers 334, 334' has a shape corresponding to the cross-section of the respective shaft body 330, so as to permit each of the first and second friction washers 334, 334' to turn with the respective pivot shaft 33. In an embodiment shown in FIGS. 3, 15, and 17 to 21, the hinge assembly 100 may further include a first cover 4 and a second cover 4'. The first cover 4 is turnably mounted to the retaining mount 1 about the first turning axis (A), and is movably coupled to the intermediate region 325 of the inner connection segment 321 of the third connection member 32 such that in response to the turning of the third connection member 32, the first cover 4 is turned with the third connection member 32 about the first turning axis (A). The second cover 4' is disposed opposite to the first cover 4 in the left-and-right direction (D3), and is turnably mounted to the retaining mount 1 about the second turning axis (A'). The second cover 4' is movably coupled to the intermediate region 325 of the inner connection segment 321 of the fourth connection member 32' such that in response to the turning of the fourth connection member 32', the second cover 4' is turned with the fourth connection member 32' about the second turning axis (A'), thereby allowing the first and second covers 4, 4' and the retaining base 1 to cooperatively shield bottoms of the hinge module 2 and the frictional positioning module 3 during transformation of the hinge module 2 between the first and second angular positions.

In an embodiment shown in FIGS. 13 and 17 to 21, the first cover 4 may include a first lateral wall 41, a pair of first cover end walls 42, and at least one first inner wall 43. The first cover end walls 42 are mounted on the first lateral wall 41 and are opposite to each other in the front-and-rear direction (D1). The first cover end walls 42 are pivotally and respectively connected to the first wall halves 121 of the retaining end walls 12 so as to permit the first cover 4 to turn about the first turning axis (A). The first inner wall is mounted on the first lateral wall 41, and is disposed inwardly of the first cover end walls 42. The first inner wall 43 is formed with a first coupling pin 44 which is configured to be slidably coupled in the inner guiding groove 321a of the third connection member 32 such that in response to the turning of the third connection member 32, the first cover 4 is turned with the third connection member 32 about the first turning axis (A).

Figure 18:
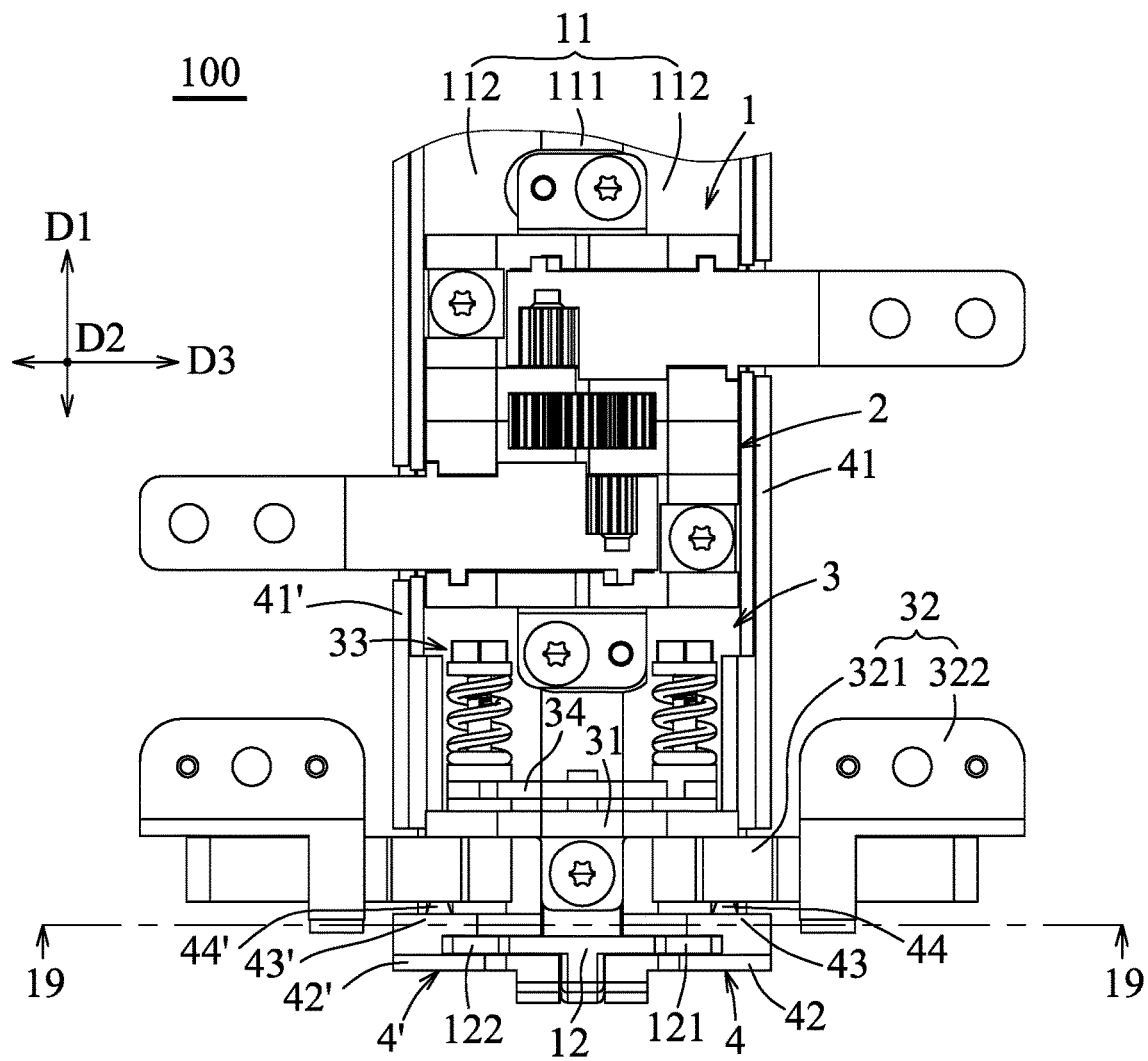
FIG. 18 is a top view of FIG. 17.
Figure 19:
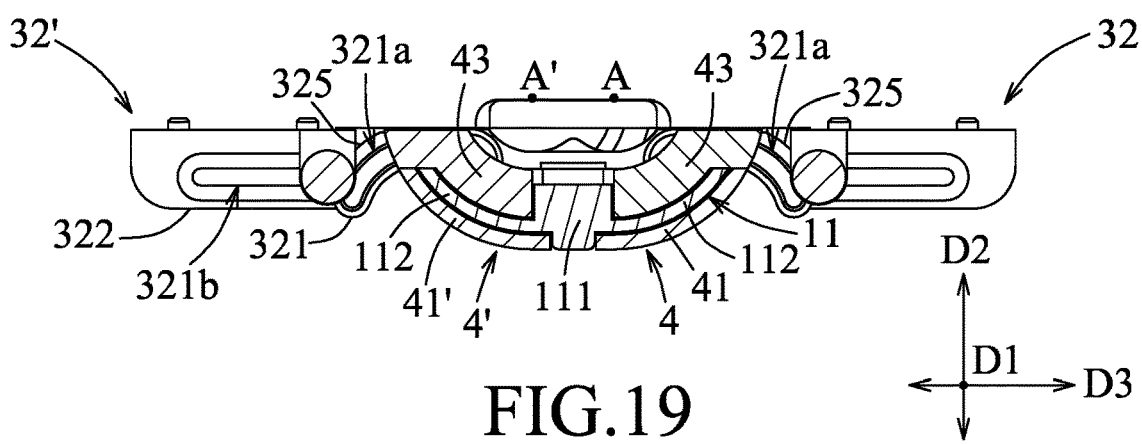
FIG. 19 is a cross-sectional view taken along line 19-19 of FIG. 18.

In an embodiment shown in FIGS. 18 and 19, at least one of the first wall halves 121 of the retaining end walls 12 is limited between the respective first cover end wall 42 and the at least one first inner wall 43, and an outer profile of each of the first lateral wall 41 and the first inner wall 43 extends about the first turning axis (A). In addition, at least one portion of a first one of the curved portions 112 is limited between the first lateral wall 41 and the at least one first inner wall 43. An inward surface of the first lateral wall 41 is in slidable contact with an outer surface of the first one of the curved portions 112, and an outward surface of the first inner wall 43 is in slidable contact with an inner surface of the first one of the curved portions 112.

In addition, the second cover 4' may include a second lateral wall 41', a pair of second cover end walls 42', and at least one second inner wall 43'. The second lateral wall 41' is disposed opposite to the first lateral wall 41 in the left-and-right direction (D3). The second cover end walls 42' are mounted on the second lateral wall 41' and are opposite to each other in the front-and-rear direction (D1). The second cover end walls 42' is pivotally and respectively connected to the second wall halves 122 of the retaining end walls 12 so as to permit the second cover 42' to turn about the second turning axis (A'). The second inner wall 43' is mounted on the second lateral wall 41', and is disposed inwardly of the second cover end walls 42'. The second inner wall 43' is formed with a second coupling pin 44' which is configured to be slidably coupled in the inner guiding groove 321a of the fourth connection member 32' such that in response to the turning of the fourth connection member 32', the second cover 4' is turned with the fourth connection member 32' about the second turning axis (A').

In an embodiment shown in FIGS. 18 and 19, at least one of the second wall halves 122 of the retaining end walls 12 is limited between the respective second cover end wall 42' and the at least one second inner wall 43', and an outer profile of each of the second lateral wall 41' and the second inner wall 43' extends about the second turning axis (A'). In addition, at least one portion of a second one of the curved portions 112 is limited between the second lateral wall 41' and the at least one second inner wall 43'. An inward surface of the second lateral wall 41' is in slidable contact with an outer surface of the second one of the curved portions 112, and an outward surface of the second inner wall 43' is in slidable contact with an inner surface of the second one of the curved portions 112.

Furthermore, the inner guiding groove 321a of each of the third and fourth connection members 32, 32' extends according to the moving track of a corresponding one of the first and second covers 4, 4'.

As shown in FIG. 2, each of the first and second frames 200, 200' may have an internal space 202 with an opening 202a which is configured to permit a corresponding one of the first and second covers 4, 4' to access the internal space 202. Therefore, when the foldable device is in any desired positions (including the folded and unfolded positions), each of the first and second covers 4, 4' may always have a portion inserted into the internal space 202 through the opening 202a of the corresponding one of the first and second frames 200, 200'. As such, the retaining mount and the first and second covers 4' 4' may always shield the hinge module 2, the frictional positioning module 3 and the internal spaces 202 of the first and second frames 200, 200', thereby permitting the foldable device to have a smooth outer appearance.

In an embodiment shown in FIGS. 1 to 3, the hinge assembly 100 may include two of the hinge modules 2, two of the frictional positioning modules 3, two of the first inner walls 43, and two of the second inner walls 43'. The hinge modules 2 are spaced apart from each other in the front-and-rear direction (D1) to permit passage of connection wires (not shown) between the first and second frames 200, 200'. The frictional positioning modules 3 are disposed at two opposite sides of the hinge modules 2.

In other embodiments, the number of the hinge modules 2, the frictional positioning modules 3, the first inner walls 43, and the second inner walls 43' may be varied based on design requirement. In an alternate embodiment, the hinge assembly 100 may not include the frictional positioning module 3 and the first and second covers 4, 4'.

In sum, because the first and second turning axes (A, A') are parallel to and offset from each other, the first and second outer segments 222, 222' of the hinge module 2 may be spaced apart from each other by a gap (D) when the first and second frames 200, 200' are in the folded position. As such, a flexible screen on the foldable device may be prevented from being damaged due to a curvature radius being too small at a folded bent portion of the flexible screen.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A hinge assembly for hingedly connecting a first frame to a second frame, said hinge assembly comprising at least one hinge module which includes:
   a first mounting base which has a left margin and a right margin opposite to said left margin in a left-and-right direction, and which includes
      a front end segment having a front groove which extends from one of said left and right margins of said first mounting base in the left-and-right direction to terminate at a front groove end, a rear end segment disposed opposite to said front end segment in a front-and-rear direction, and having a rear groove which extends from the other one of said left and right margins of said first mounting base in the left-and-right direction to terminate at a rear groove end, and a middle segment disposed between said front and rear end segments;

a first connection member having a first inner segment coupled inside said front groove to be turnable about a first turning axis in the front-and-rear direction, and a first outer segment extending outwardly from said first inner segment, and configured for being connected to the first frame;

a second connection member having a second inner segment coupled inside said rear groove to be turnable about a second turning axis which is parallel to and offset from the first turning axis, and a second outer segment extending outwardly from said second inner segment, and configured for being connected to the second frame; and a transmission unit disposed on said middle segment of said first mounting base, and configured to couple said first inner segment of said first connection member to said second inner segment of said second connection member such that said first and second connection members are permitted to turn in opposite rotational directions from each other whilst turning simultaneously and respectively about the first and second turning axes relative to said first mounting base, and such that said hinge module is transformable between a first angular position, where said first and second outer segments are distal from each other, and a second angular position, where said first and second outer segments are proximate to and spaced apart from each other by a gap.

2. The hinge assembly according to claim 1, wherein said hinge module further includes two guiding units which are provided respectively in said front and rear grooves, and two guided units which are provided respectively on said first and second inner segments, and which are respectively guided by said two guiding units so as to permit said first and second inner segments to respectively turn about the first and second turning axes.

3. The hinge assembly according to claim 1, wherein each of the first and second turning axes is located above said first mounting base.

4. The hinge assembly according to claim 1, wherein each of said front and rear grooves is configured such that when said hinge module is in the first angular position, said first and second inner segments are respectively received in said front and rear grooves, and such that when said hinge module is in the second angular position, said first and second inner segments are disposed to partially extend out from said front and rear grooves, respectively.

* * * * *